UNITED STATES PATENT OFFICE.

ARTHUR EICHENGRÜN AND KARL DEMELER, OF ELBERFELD, GERMANY, ASSIGNORS TO FARBENFABRIKEN OF ELBERFELD CO., OF NEW YORK, N. Y., A CORPORATION OF NEW YORK.

AMIDOÖXYBENZYL COMPOUND AND PROCESS OF MAKING SAME.

SPECIFICATION forming part of Letters Patent No. 696,020, dated March 25, 1902.

Application filed August 5, 1901. Serial No. 70,927. (Specimens.)

*To all whom it may concern:*

Be it known that we, ARTHUR EICHENGRÜN and KARL DEMELER, doctors of philosophy, chemists, residing at Elberfeld, Germany, (assignors to the FARBENFABRIKEN OF ELBERFELD CO., of New York,) have invented a new and useful Improvement in New Chemical Bodies and Processes of Making Same; and we hereby declare the following to be a clear and exact description of our invention.

We have found that new amido compounds having the following general formula

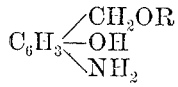

(in which formula R means hydrogen, an alkyl or acidyl radical, such as methyl, ethyl, acetyl, or the like,) can be obtained by first treating nitrophenols with the so-called "halogen methylic alcohols," having the formulæ $CH_2ClOH, CH_2BrOH, CH_2JOH$—that is to say, the reaction products from formic aldehyde or substances which are capable of yielding formic aldehyde and from haloid acids, such as HCl, HJ, BrH—in the presence of suitable condensing agents; secondly, treating the resulting derivatives of nitrophenols containing the group — $CH_2X$ (X meaning a halogen atom) with hot water, alcohols, organic acids, or the alkaline salts of these acids, and, finally, reducing the so-produced nitroöxybenzyl alcohols, their ethers, and esters. The new bodies thus obtained are crystalline compounds readily soluble in dilute mineral acids and in diluted solutions of caustic alkalies and carbonates of alkalies, soluble in alcohol and soluble with difficulty in water and ether. They form salts with caustic alkalies and with mineral acids. At present we find that the new bodies are of especial value as photographic developers.

In carrying out the new process practically we can proceed as follows, the parts being by weight: Five parts of zinc chlorid are added to a solution of ten parts of paranitrophenol in eight parts of chloromethyl alcohol. The mixture turns hot spontaneously. After about twenty-four hours the new compound having the formula

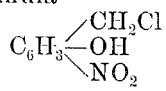

precipitated in the mixture during the reaction is filtered off and purified by a recrystallization from benzene. It represents small needles melting at about 132° centigrade. Subsequently a mixture prepared from the chloromethylic-para-nitrophenol thus obtained and the tenfold quantity of water is heated for some time until a clear solution results. From the filtered liquid the new product having the formula

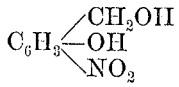

precipitates on cooling in the shape of crystals melting at about 128° centigrade. In order to reduce the said body, two parts of tin are added to a mixture of one part of nitroparaoxybenzyl alcohol and ten parts of concentrated hydrochloric acid. The reaction goes on quietly and can be accelerated by heating. After cooling the double salt of tin of the new amidoparaoxybenzyl alcohol separates. It is dissolved in water and decomposed by a solution of sodium carbonate. The free amidoparaoxybenzyl alcohol is dissolved in ether, from which solution it is obtained in a solid state.

The new base having the formula

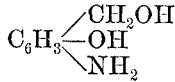

represents colorless leaves which are decomposed in contact with the air, soluble in hot water, in alcohol, and in ether, melting at from 135° to 142° centigrade. It forms salts with alkalies and with acids. The hydrochlorid forms white needles which are stable.

The process proceeds in an analogous manner if other nitrophenols—viz., orthonitrophenol—are employed, or if the ethers and esters of nitroöxybenzyl alcohols are reduced. The corresponding amido compound obtained from nitroparaoxybenzylmethyl ether having the formula

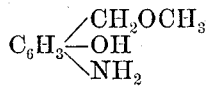

represents slightly-yellowish leaves melting at 125° to 126° centigrade.

Having now described our invention and in what manner the same is to be performed, what we claim as new, and desire to secure by Letters Patent, is—

1. The process for producing new amido compounds having the hereinbefore-defined general formula

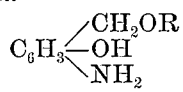

by first treating nitrophenols with the so-called halogen methylic alcohols in the presence of suitable condensing agents, secondly treating the resulting derivatives of nitrophenols with water, alcohols, organic acids or the alkaline salts of these acids and finally reducing the so-produced nitroöxybenzyl alcohols their ethers and esters, substantially as hereinbefore described.

2. The process for producing a new product having the formula

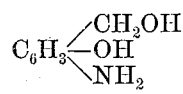

by first treating para-nitrophenol with chloromethylic alcohol, secondly heating the resulting chloromethylparanitrophenol with water and finally reducing the paranitroöxybenzyl alcohol thus produced, substantially as hereinbefore described.

3. The herein-described new amido compounds which are crystalline substances readily soluble in dilute acids and in diluted solutions of caustic alkalies and carbonates of alkalies, soluble in alcohol and soluble with difficulty in water and in ether, forming salts with alkalies and with mineral acids, substantially as hereinbefore described.

4. The herein-described amidoparaoxybenzyl alcohol having the formula

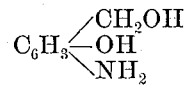

which represents in free state colorless leaves which are decomposed in contact with the air, soluble in hot water, alcohol and ether, forming salts with caustic alkalies and acids and having the melting-point of 135° to 142° centigrade and which as hydrochlorid forms white needles, substantially as hereinbefore described.

In testimony whereof we have signed our names in the presence of two subscribing witnesses.

ARTHUR EICHENGRÜN.
KARL DEMELER.

Witnesses:
 OTTO KÖNIG,
 FRITZ ALBERS.